No. 887,693. PATENTED MAY 12, 1908.
G. E. RICHMOND.
MACHINE FOR CUTTING BALED HAY.
APPLICATION FILED SEPT. 26, 1907.
2 SHEETS—SHEET 1.
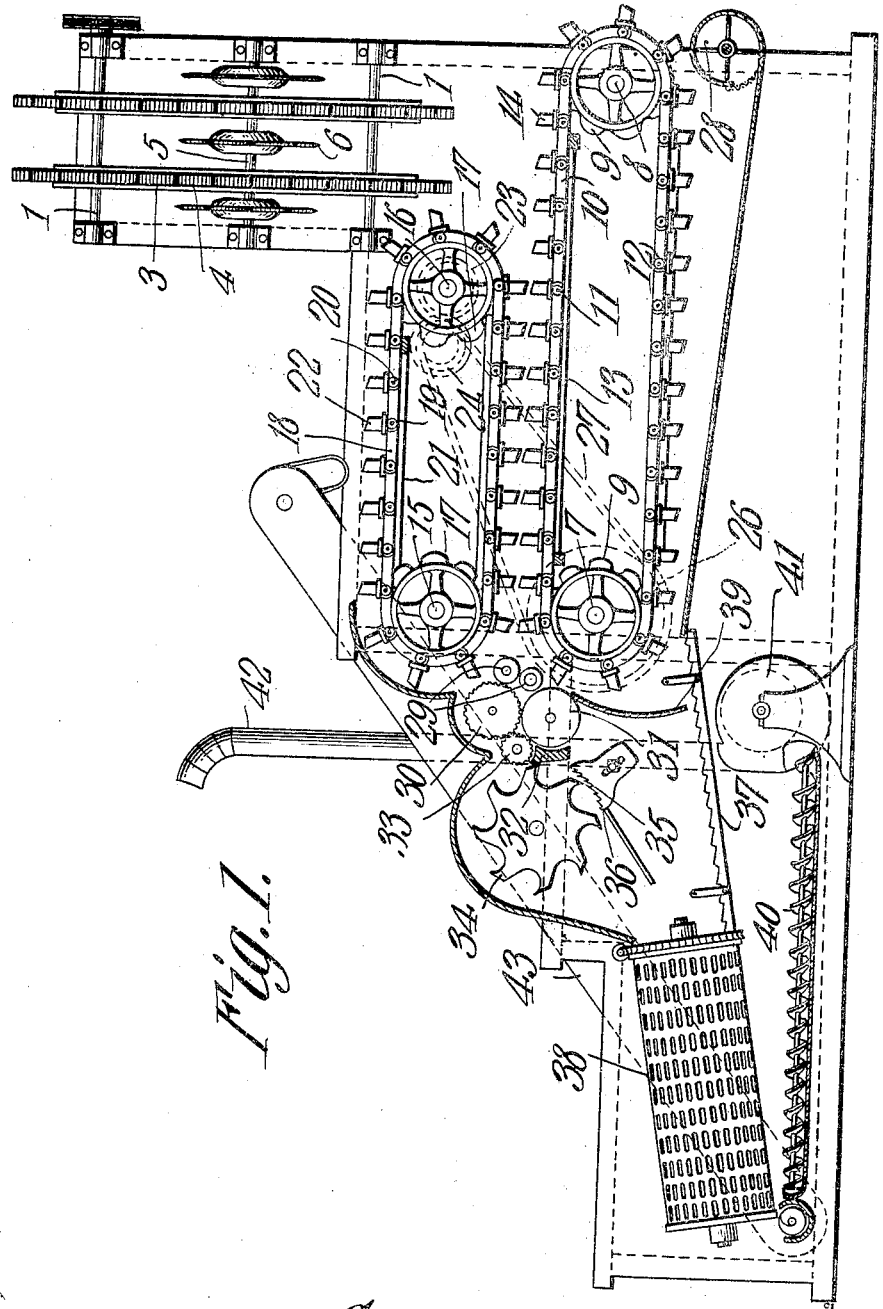
Witnesses
Inventor
George E. Richmond
By
Attorneys

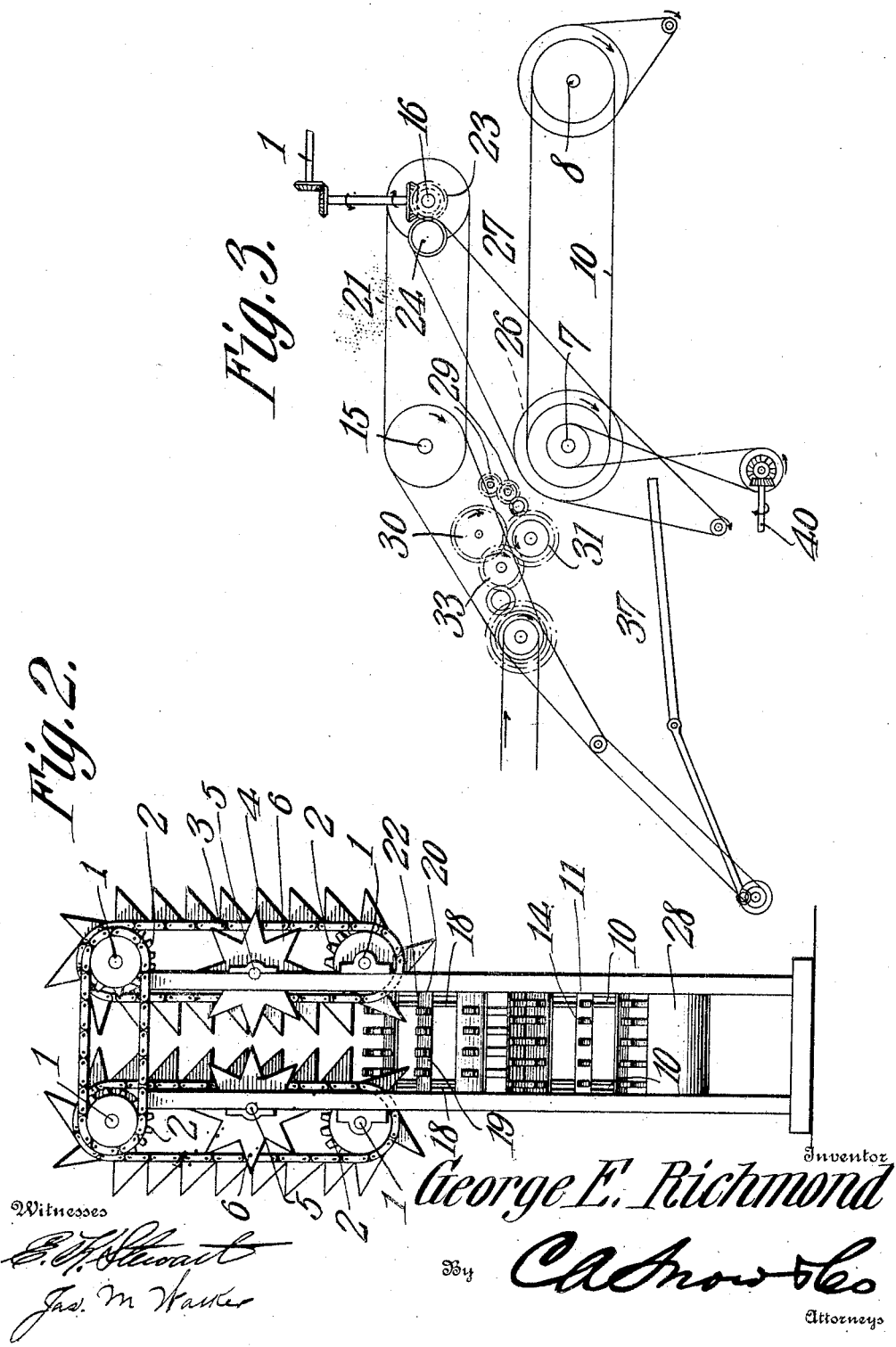

UNITED STATES PATENT OFFICE.

GEORGE E. RICHMOND, OF HOUSTON, TEXAS, ASSIGNOR OF ONE-HALF TO FRANK B. WEEKS, OF HOUSTON, TEXAS.

MACHINE FOR CUTTING BALED HAY.

No. 887,693.

Specification of Letters Patent.

Patented May 12, 1908.

Application filed September 26, 1907. Serial No. 394,750.

*To all whom it may concern:*

Be it known that I, GEORGE E. RICHMOND, a citizen of the United States, residing at Houston, in the county of Harris and State of Texas, have invented a new and useful Machine for Cutting Baled Hay, of which the following is a specification.

This invention has relation to machines for cutting baled hay and the like and it consists in the novel construction and arrangement of its parts as hereinafter shown and described.

The object of the invention is to provide a machine which is adapted to receive a bale of hay and cut the same into slices which are deposited upon an endless conveyer and which are operated upon by a combing mechanism in order that the strands of hay may be brought into parallel relation and end-on toward a set of feed rollers. A cutting apparatus is located adjacent the feed rollers and operates upon the straightened material after it comes from the feed roll and reduces or disintegrates the same. The material thus cut is passed into a rotating sieve and the parts of sufficient fineness pass through the said sieve and are carried by a screw conveyer or other conveyer to a pneumatic conveyer which takes the material up and conducts the same to any desired point. The material that does not pass through the mesh of the sifter is carried by a conveyer back to the combing mechanism where it is again run through the cutting apparatus. Means is provided for permitting foreign bodies, such as stones, bits of iron, etc. to escape from the material as the bale is disintegrated, and at the same time, a fan is provided for recovering leaves and small particles of the hay from the foreign bodies so separated.

In the accompanying drawing:—Figure 1 is a side elevation of the machine partly in section. Fig. 2 is an end elevation of the same, and Fig. 3 is a diagrammatic view showing how movement is transmitted to the parts.

The mechanism for receiving and slicing the bale consists of the shafts 1—1, journaled for rotation and arranged in pairs one above the other. The said shafts are provided with alined sprocket wheels 2 around which the sprocket chains 3 pass. The links of the chains 3 are provided with the impaling points 4 which are adapted to enter the bale and carry the same down as the shafts 1 rotate. The cutter shafts 5 are journaled for rotation between the upper and lower shafts 1 and are provided with the star-shaped cutters 6. The shafts 5 are caused to rotate at a greater rate of speed than the shafts 1, thus, as the bale is lowered between the shafts 5 at a relatively low rate of speed the cutters 6 are rotated at a relatively high rate of speed and reduce the bale to slices.

The conveying and combing apparatus is located below the slicing apparatus above described and consists of the shafts 7 and 8 upon which are mounted alined sprocket wheels 9. The chain belts 10 pass around the sprocket wheels 9 and are connected together by the cross rods 11. The cross rods are provided at their ends with rollers 12 which are adapted to run upon the track-strips 13 provided at the opposite sides of the machine. The teeth 14 are mounted upon the cross rods 11. The shafts 15 and 16 are located above the shafts 7 and 8 and are provided with sprocket wheels 17. The chain belts 18 pass around the sprocket wheels 17 and are connected together by cross rods 19 having rollers 20. The rollers 20 run upon the track strips 21 provided at the side of the machine and the rods 19 are provided with combing teeth 22. The gear wheel 23 is mounted upon the shaft 16 and meshes with the pinion 24. A sprocket wheel 25 is mounted for rotation with the pinion 24 and a sprocket wheel 26 is mounted upon the shaft 7. The sprocket chain 27 passes around the sprocket wheels 25 and 26. Thus as the shaft 15 rotates, the chains 18, carrying the combing teeth 22 are carried around the sprocket wheels 17 at a certain rate of speed. As the shaft 16 rotates the gear wheel 23 meshing with, the pinion 24 rotates the sprocket wheel 25 in the opposite direction, which movement is transmitted through the chain 27 and sprocket wheel 26 to the shaft 7 which in turn moves the chains 10 in the opposite direction from that in which the chains 18 are moving and at a slower rate of speed for the reason that the gear wheel 23 and the pinion 24 are of less diameter than the sprocket wheels 17 as is also the sprocket wheel 24, while the sprocket wheel 26 is of greater diameter than the sprocket wheels 17. The chains 10 are longer than the chains 18 and extend under the slicing apparatus consequently the sections of the bale are deposited from the slicing apparatus upon the chains 10 and are caught up by the teeth 14 of the rods thereof and carried under the chains 18. As the chains 18 are moving at a greater rate of speed the teeth 22 comb the strands of hay and bring the same into parallel relation, or substantially so lying in alinement with the longitudinal axis of the conveying apparatus. As the material is being thus straightened out along the rods 11 any foreign objects such as stone, bits of wire or metal will fall through the spaces between said rods into the bottom of the machine, while the leaves and finer particles of hay which would fall through the spaces between the rods 11 will be operated upon by a blast of air from the fan 28 located below the conveyer including said rods, and carried toward the cutting apparatus.

The feed rollers 29 are journaled for rotation at the delivering end of the chain belts 10 and 18 and receive the straightened material from the teeth and rods carried by the said belts. The rollers 30 and 31 are journaled for rotation adjacent the feed rollers 29. The roller 30 is provided with a roughened or corrugated periphery while the roller 31 is provided with a smooth periphery. The cutter bar 32 is located adjacent the roller 31 and the roller 33 is journaled for rotation above the said cutter bar and in close proximity to the same. The roller 33 is provided with a corrugated or roughened periphery. A rotating cutter 34 is adapted to coöperate with the cutter bar 32 in cutting the material as it passes under the roller 33. The concave 35 is located below the cutter bar 32 and is provided with the teeth or blades 36 which coöperate with the cutter 34 in further reducing or macerating the material after it falls from the cutter bar 32. From the cutting apparatus the material falls upon the inclined shaker 37 from which it passes into the upper end of the inclined cylindrical rotating screen 38.

The deflector plate 39 is provided between the fan 28 and the screen 38 for the purpose of carrying the material operated upon by the blast of the fan up to the feed rollers and also for supplying sufficient upward air current at the feed rollers to hold the material passing through the feed rollers in proper position. The screw conveyer 40 is located below the screen-sifter 38 and extends back to the pneumatic conveyer 41. The conveyer 41 is provided with a spout 42. The material that sifts through the screen 38 is carried by the screw-conveyer 40 to the pneumatic conveyer 41 which forces it through the spout 42 to any desired point. The material which does not pass through the mesh of the screen 38 falls from the lower end thereof and is taken up by the endless conveyer 43 and carried up and deposited upon the upper sides of the rods 19. This material is then straightened out and again passed through the cutting apparatus as above described.

Having described my invention what I claim as new and desire to secure by Letters-Patent is:—

1. A machine as described comprising a frame, a cutter mounted thereon, a conveyer and combing mechanism for delivering material to the cutter, a bale slicing mechanism for delivering material to the conveyer and combing mechanism and means for operating the several parts.

2. A machine as described comprising a frame, a cutter mounted thereon, a conveyer and combing mechanism for delivering material to the cutter, a bale slicing mechanism for delivering material to the conveyer and combing mechanism, a screen adapted to receive material from the cutter, means for returning the material rejected by the screen to the combing mechanism, and means for operating the several parts.

3. A machine as described comprising a frame, a cutting mechanism including a feed mechanism mounted thereon, means for forcing a blast of air under the feed mechanisms, a conveyer and combing mechanism for delivering material to the feed mechanism, a bale slicing mechanism for delivering material to the conveyer and combing mechanism, and means for operating the several parts.

4. A machine as described comprising a frame, a bale slicing mechanism mounted thereon, a foraminous conveyer located under the slicing mechanism, a combing mechanism coöperating with said conveyer, means for forcing a blast of air under the conveyer, a cutting mechanism located at the delivery ends of the conveyer and combing mechanisms, and means for operating the several parts.

5. A machine as described comprising a frame, a cutting mechanism mounted thereon, conveyer and combing mechanisms which move at different rates of speed for delivering material to the cutting mechanism, a bale slicing mechanism for delivering material to the conveyer and combing mechanisms, and means for operating the several parts.

6. A machine as described comprising a frame, a cutting mechanism mounted thereon, a conveyer for delivering material to the cutting mechanism and moving at one rate of speed, a combing mechanism coöperating with said conveyer and moving at a greater rate of speed, a bale slicing mechanism for delivering material to the conveyer, and means for operating the several parts.

7. A machine as described comprising a frame, a cutting mechanism mounted thereon, a conveyer and combing mechanism for delivering material to the cutting mechanism, a bale slicing mechanism for delivering material to the conveyer and combing mechanism and having impaling elements adapted to carry the bale and stelliform cutters adapted to cleave the bale, and means for operating the several parts.

In testimony that I claim the foregoing as my own, I have hereto affixed my signature in the presence of two witnesses.

GEORGE E. RICHMOND. [L. S.]

Witnesses:
E. N. MILLS,
M. E. THOMSON.